C. W. DRAKE.
GRAPPLE.
APPLICATION FILED JULY 30, 1912.

1,056,516.

Patented Mar. 18, 1913.

Inventor
C. W. Drake.
By Eugene E. Stevens
Attorney

Witnesses
E. Larson
M. A. Schmidt

COLUMBIA PLANOGRAPH CO., WASHINGTON, D. C.

UNITED STATES PATENT OFFICE.

CHARLES W. DRAKE, OF WELLINGTON, TEXAS.

GRAPPLE.

1,056,516.  Specification of Letters Patent.  Patented Mar. 18, 1913.

Application filed July 30, 1912. Serial No. 712,236.

*To all whom it may concern:*

Be it known that I, CHARLES W. DRAKE, a citizen of the United States, residing at Wellington, in the county of Collingsworth and State of Texas, have invented certain new and useful Improvements in Grapples, of which the following is a specification.

This invention relates to devices for removing pipes or tubing from wells, and its object is to provide a cheap, simple, durable and easily operated device of this kind, and also one which is readily adjustable to pipes or tubing of different diameters.

With this object in view, the invention consists in a novel combination and arrangement of parts to be hereinafter described and claimed, reference being had to the accompanying drawing, in which—

Figure 1:
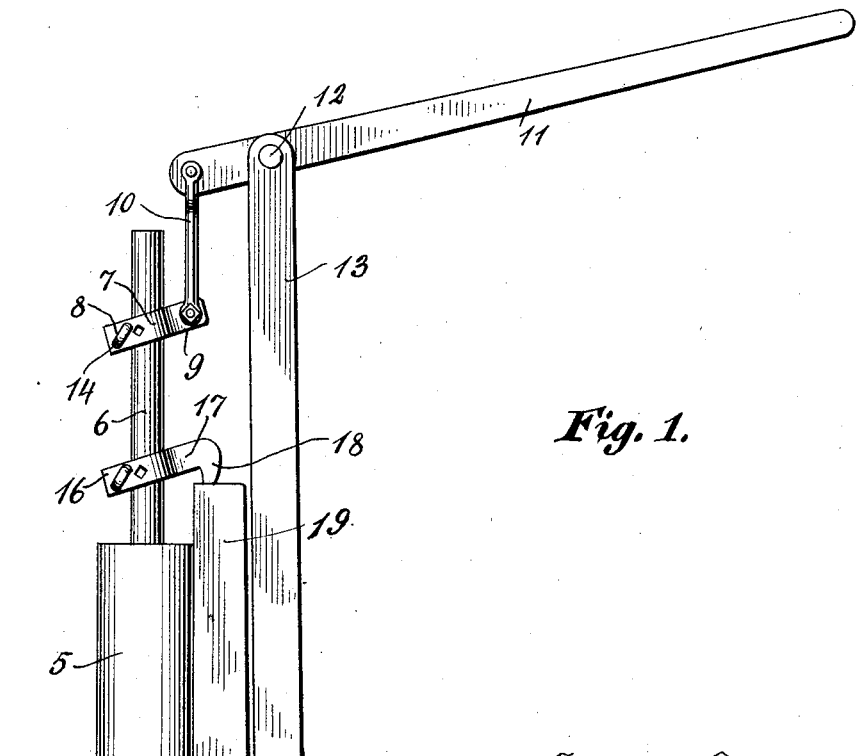
Figure 2:
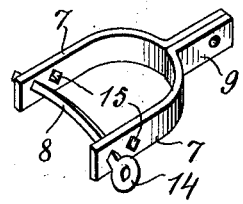
Figure 3:
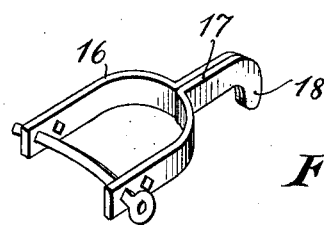

Figure 1 is an elevation showing the device in use. Figs. 2 and 3 are perspective views of the two grapples.

Referring specifically to the drawing, 5 denotes the upper end of a well casing from which the pipe 6 is to be removed. The device for accomplishing this comprises two grapples which are adapted to engage the pipe, the upper grapple serving to lift the pipe, and the lower one acting as a clutch to hold the pipe while the upper grapple is taking a new hold. The upper grapple comprises a yoke, the two branches 7 of which straddle the pipe, and carry a cross-pin 8 which is designed to come in contact with the pipe, on one side thereof. The yoke has a shank 9 which latter is connected by a link 10 to an operating lever 11 fulcrumed at 12 between the upper ends on a pair of uprights 13. The pin has one of its ends formed into an eye 14 for convenience in handling the same. It will also be noted that the pin is angular in cross-section and curved intermediate its ends in the direction of its length. The yoke branches have apertures in which the pin is mounted and the pin extends transversely between said branches near the outer ends thereof. The pin is made angular in cross-section in order to provide sharp edges to engage the pipe, whereby a tight grip on the latter is had, and all danger of the same slipping is thus obviated. By making the pin curved, the grapple can be readily adjusted to pipes of different diameters. Upon rotating the pin it is brought toward or from the pipe. It will, of course, be understood, that the pin, in view of the fact that it is angular in cross-section, must be removed from the yoke before it can be turned and adjusted to suit the pipe. In order to provide a wide range of adjustment, the yoke branches have a plurality of openings 15 for the pin. When the grapple is in holding position, it is inclined as shown in Fig. 1, the sharp edge of the pin being in contact with the pipe on one side, and the upper edge of the rear portion of the yoke engaging the opposite side of the pipe, the latter extending between the yoke branches. The rear ends of the yoke branches are brought together in a curve as clearly shown in Fig. 2 so that they extend partly around the pipe and thus have an extended bearing surface.

The lower grapple 16 is in all respects similar to the top grapple except that its shank 17 has a downturned hook 18 at its extremity.

In operation, the two grapples are placed around the pipe to be pulled out of the well, the uprights being placed close thereto. The lower grapple is not connected to the lever 11 but has its hook-shaped shank 17 resting loosely on top of a suitable support 19. The lever being now operated, the pipe is pulled out of the well on the up-stroke of that end of the lever which carries the top grapple, the latter gripping the pipe and pulling it up, and on the down-stroke, the grapple lets go of the pipe and slips down the same to take a new hold on the next up-stroke. The lower grapple grips the pipe and holds the same when the upper grapple is taking a new hold, and when the pipe is moving upward, said lower grapple comes into release position.

The device is very simple in construction and easily operated. The uprights and lever are connected by a single pin which serves as the pivot of the lever, and fastens the three pieces together in the simplest manner. The uprights rest loosely on the ground, which is essential because in lifting the pipe from the well, the pipe is inclined to shift laterally more or less, which makes it necessary for the device to swing with it.

I claim:

A lifting device comprising upper and lower grapples, each of which comprises a member carrying a cross-pin which is angular in cross-section and curved in the direction of its length, said pin being rotatable, a lever operatively connected to the upper grapple, and a support for the lower grapple.

In testimony whereof I affix my signature in presence of two witnesses.

CHARLES W. DRAKE.

Witnesses:
J. R. BENSON,
E. E. McCOLLISTER.

Copies of this patent may be obtained for five cents each, by addressing the "Commissioner of Patents, Washington, D. C."